July 11, 1967

R. S. KENNEDY ETAL 3,330,583

SAFETY LATCH

Filed May 14, 1964

INVENTORS R.S. KENNEDY
D.W. MATHISON
BY
ATTORNEY

July 11, 1967 R. S. KENNEDY ETAL 3,330,583
SAFETY LATCH
Filed May 14, 1964 4 Sheets-Sheet 2
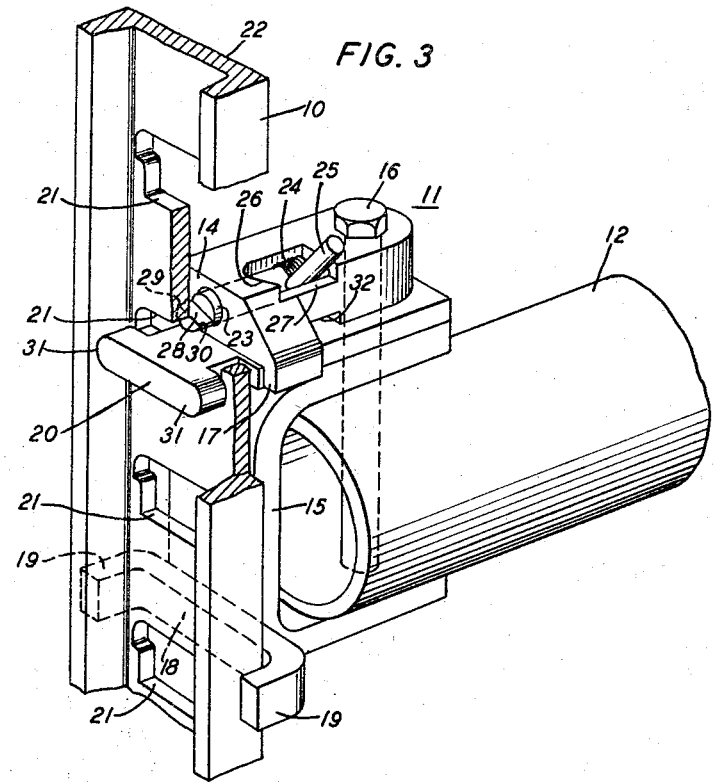
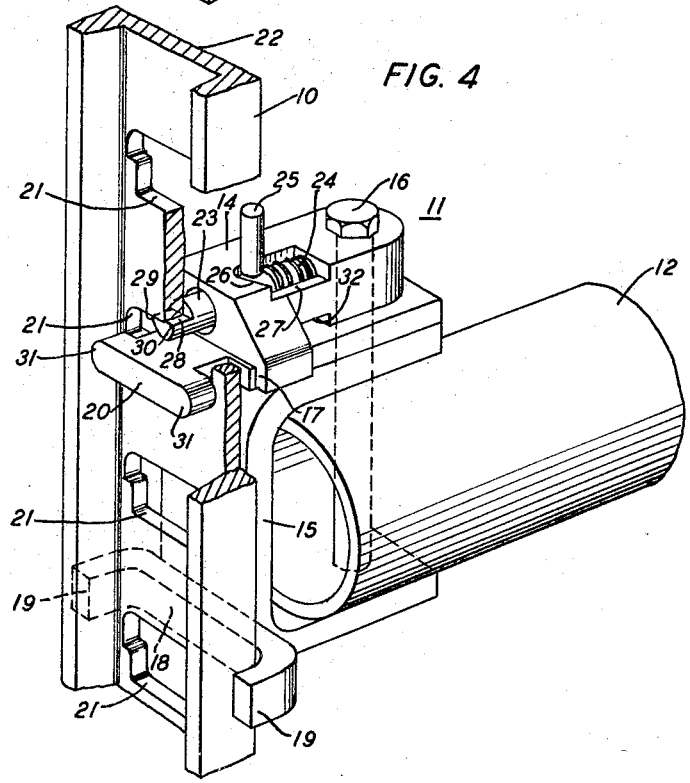

July 11, 1967

R. S. KENNEDY ETAL 3,330,583

SAFETY LATCH

Filed May 14, 1964

United States Patent Office 3,330,583
Patented July 11, 1967

3,330,583
SAFETY LATCH
Rudolph S. Kennedy, New Providence, and David W. Mathison, Basking Ridge, N.J., assignors to Bell Telephone Laboratories, Incorporated, New York, N.Y., a corporation of New York
Filed May 14, 1964, Ser. No. 367,513
3 Claims. (Cl. 287—189.36)

This invention relates to latching devices, and more specifically, to latching devices having automatic locking means.

The mounting of platforms and other similar devices upon slotted racks by using a latch having a projection that interfits with a rack slot is known in the prior art. These devices usually comprise a body member that includes a T-shaped projection that is adapted to interfit with an appropriately shaped slot in the rack.

If the platform is designed to support the weight of a man or expensive equipment, or if it is to be used in an environment in which public safety is involved, the latch must be equipped with a locking device to prevent falls caused by the accidental extraction of the device from the rack. Some of the prior art devices have solved this problem by including a spring loaded locking bolt in the body member of the device. The bolt slides into the rack slot and prevents the extraction of the projection from the slot.

The inclusion of a locking device only, however, creates other problems. For example, if the lock is not automatic, i.e., if it is manual and requires a separate operation by the workman to lock it, experience has shown that the workman will not use the lock because it is deemed to be too troublesome and time consuming. Such a practice is obviously dangerous and can result in falls that cause personal injuries and damage to equipment.

Making the latch lock purely automatically solves the above problem but creates others. What is meant by an automatic lock is one that will lock the latching device to a rack without any additional operation by the workman other than mounting the device upon the rack.

It is common practice to rack mount platforms in a manhole well above the height a workman standing on the manhole floor can reach. These platforms require the workman to stand on a ladder to mount the platform and take it down. If the latch includes a purely automatic lock, the workman on the ladder must use one hand to hold the lock open and the other to dismount the latch from the rack. Such a practice is also obviously dangerous. To supply the latch with means to hold the lock open results essentially in a manual lock whose disadvantages have already been described.

The latch embodying the invention includes the desirable features of both a manual and an automatic locking latch without being subject to the disadvantages of either.

The invention is embodied within a rugged but simple latching device that comprises a body member, a projection, and a locking bolt. The bolt is retractable, rotatable, and spring loaded within the body member, so that it is constantly urged in an extended position. The projection is shaped and adapted to interfit with appropriately shaped slots or openings in mounting racks and the bolt is adapted to slide into the slots after the projection is seated to prevent the extraction of the projection from the slot.

The body member includes an opening in its upper surface through which a lever arm projects. The arm is rigidly secured to the locking bolt and is the means by which the bolt is retracted and rotated to an unlocked position. The degree of retraction and rotation is limited by the dimensions of the opening.

One edge of the opening comprises a cam surface which cooperates with the bolt lever arm to set up the device for attachment to a rack. Thus, the bolt is preset to automatically lock the projection in the rack slot when the device is attached to the rack.

The front surface of the bolt includes a cam having two extended points, one of which extends slightly farther than the other. The bolt face cam serves a dual function. The first function is an unlocking function. When the bolt arm is retracted and rotated, the shorter point catches one edge of the rack slot and holds the bolt in an unlocked position, thus allowing the device to be removed from the rack.

The second function is a second positioning function. The body cam surface, as previously mentioned, initially sets up the locking bolt so that it will be positioned to automatically lock the device to the rack when it is mounted thereupon. The longer point, during the insertion process, frictionally cooperates with the face of the cable rack to cause a torque upon the rotatable locking bolt. This maintains the locking position of the bolt that was previously determined by the body cam or re-positions the bolt in the locking position to insure its locking when inserted upon the rack.

The invention will be better understood and its advantages and features will be more readily apparent upon the study of the following detailed description of an illustrative embodiment when read in conjunction with the drawing, in which:

FIG. 3 is a perspective view of the device mounted upon a cable rack with the locking bolt in the unlocked position;

FIG. 4 is a perspective view of the device in its mounted, locked position upon the rack;

Figure 1:
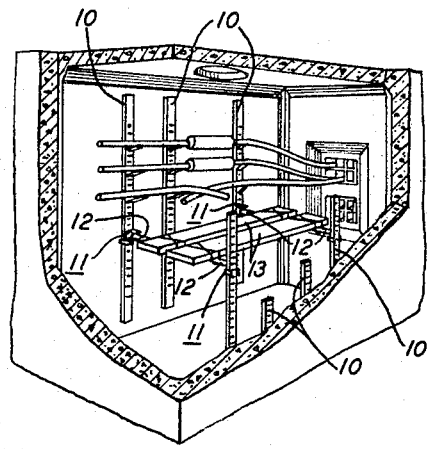
FIG. 1 is a perspective view of a manhole showing one of the contemplated uses for the device.

FIG. 1 illustrates one contemplated use of a device embodying the invention. A manhole is shown having a series of racks 10 extending in a vertical direction and attached to the side walls of the manhole. Four latching devices 11 are attached to the racks 10 and two tubes 12 are suspended at each of their ends by the four latches 11. Planking 13 is then laid over the tubes 12 to form a platform.

Figure 2:
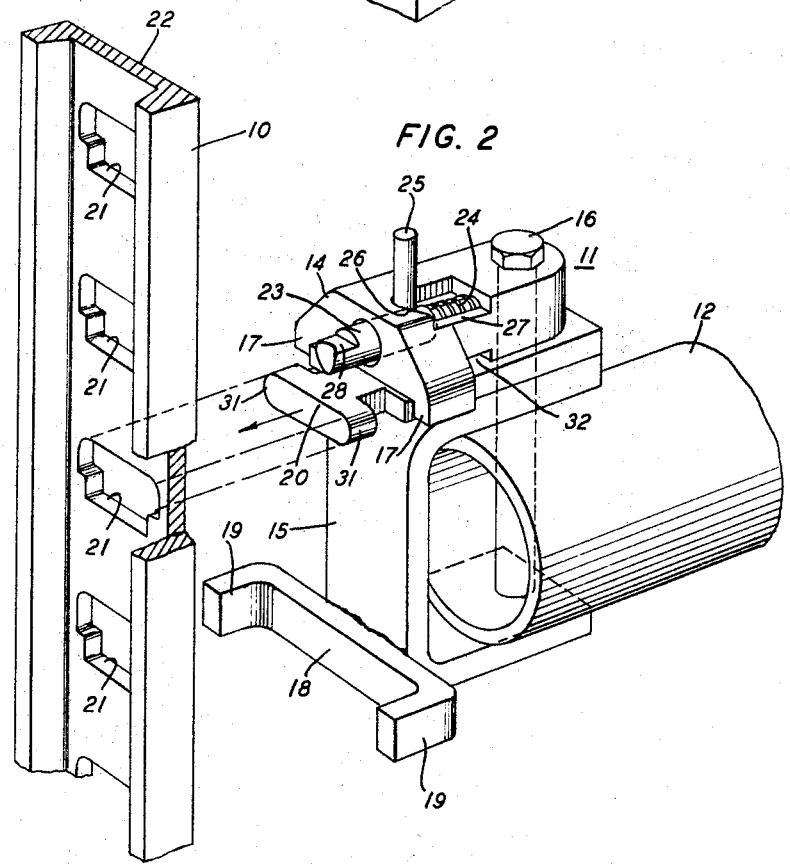
FIG. 2 is a perspective view of a device embodying the invention and a section of a rack to which the device is to be subsequently united.

The illustrative embodiment of the invention, shown in FIG. 2, comprises a body member 14 that is attached to a platform support 15. The member 14 may be securely attached to the support 15 by means of a single threaded fastener 16. The fastener 16 may also be used to attach the tubes 12 to the support 15. The tabs 17 on the member 14 in the illustrative embodiment keep the member 14 concentric with the support 15 by preventing rotation of the member 14 with respect to the support 15. It is obvious that other means such as welding, clipping, and other similar means, may be employed to assemble the member 14, support 15, and tubes 12. Each assembly technique should be adapted to the convenience of each particular use.

The support 15 includes a rack guide 18 that further includes two ears 19. The ears 19 are spaced from each other a distance sufficient to span the rack 10. The guide 18 thus prevents rotation of the device 11 with respect to the rack 10. Interspaced between the member 14 and the support 15 is a T-shaped head or projection 20. The rack 10 includes a face 22 that has a series of T-shaped openings or slots 21 located therein. The projection 20 is adapted to interfit with the T-shaped slots 21 in the rack 10.

The device further includes a spring loaded retractable and rotatable locking bolt 23. A spring 24 acts against the member 14 and a shoulder on the bolt 23 to urge the bolt 23 in the direction shown in FIG. 2. Rigidly attached to the bolt 23 is a lever arm 25 that extends through an opening in the upper surface of the member 14. The arm 25 is the means by which the bolt 23 is retracted and rotated as shown in FIG. 3. The size of the opening in the top surface of the member 14 defines the amounts that the bolt 23 may be retracted and rotated.

The opening in the member 14 serves other functions besides defining the limits of movement of the bolt 23. The edge of the opening nearest the projection 20 is angled with respect to the rack face 22 or the other edges of the opening to form a body cam 26. An edge 27 adjacent to the body cam 26 is cut away to allow the bolt 23 and its associated lever arm 25 to be rotated.

Figure 6:
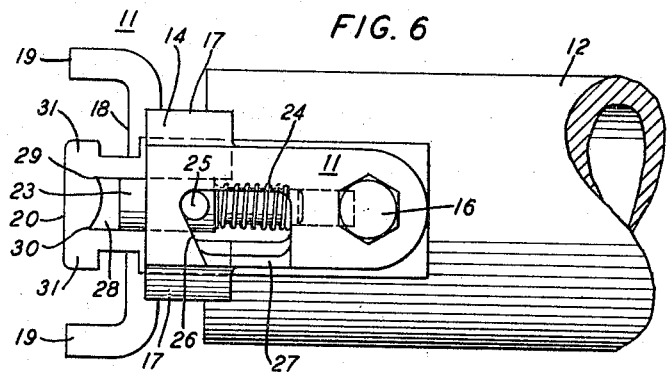
FIGS. 5 and 6 are top views of the device showing the cam action of the body cam.
Figure 5:
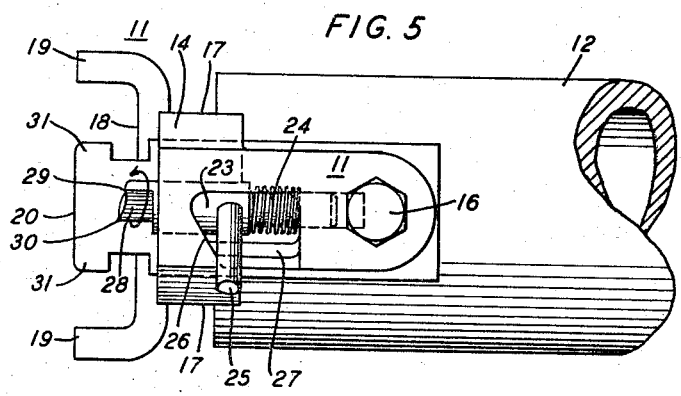

The body cam 26 cooperates as shown in FIGS. 5 and 6 with the lever arm 25 to position the bolt 23 in the automatic locking position. This position is shown in FIGS. 2 and 6, and comprises the bolt 23 with the lever arm 25 extended vertically in a direction parallel to the longitudinal axis of a rack 10. When the bolt 23 is rotated and retracted as shown in FIG. 5, the spring 24 urges the bolt 23 in a forward direction. This causes the arm 25 to contact the cam 26. As the bolt 23 is further urged forward by the spring 24 into its fully extended position, the cam 26 causes the bolt 23 to rotate until it is in a vertical position as shown in FIG. 6.

Thus the cooperation between the cam 26, the lever arm 25, and the spring 24, positions the bolt 23 so that it will automatically lock when the device 11 is engaged with a slot 21 in a rack 10.

The exposed end of the bolt 23 includes a flattened area to form a locking seat 28. When the device 11 is mounted upon a rack 10, the projection 20 is engaged with one of the slots 21 in the rack 10. Both the projection 20 and the slots 21 are T-shaped and of such dimension that they can be interfitted. When the projection 20 is interfitted with a slot 21 as shown, for example, in FIGS. 3 and 4, the extended portions 31 of the projection 20 cannot be pulled out of the slot 21 without first raising the device 11 so that the extended portions 31 of the projection 20 will register with the widest part of the slot 21.

The device 11 is locked upon the rack 10 by sliding the bolt 23, under spring pressure created by the spring 24, into the slot 21 with the projection 20. The locking seat 28 then butts against the upper edge of a slot 21, as shown in FIG. 4, and prevents the device 11 from being raised vertically with respect to the longitudinal axis of the rack 10. The extended portions 31 of the projection 20 cannot then be brought into registry with the widest part of the slot 21 and the device 11 is thus locked to the rack 10.

In addition to the seat 28, the end of the bolt 23 includes a crescent-shaped cam that results in two extended points 29 and 30 of which point 29 is shorter than point 30. FIG. 6 clearly shows the relation of the two points 29 and 30 to each other.

The function of point 29 is to hold the device 11 in an unlocked position. To unlock the device 11, a workman, by means of the lever arm 25, first retracts the bolt 23 within the body member 14 thus extracting the bolt 23 with its locking seat 28 from the slot 21. The bolt 23 is then rotated as shown in FIG. 3 and as permitted by the width of the opening in the body member and the cut down edge 27. The rotation of the bolt 23 causes the point 29 to be raised above the upper edge of the slot 21. Thus, when the workman releases the lever arm 25, the spring 24 will force the point 29 into contact with the face 22 of the rack 10. The device 11 will then be held in an unlocked position. It should be noted that the body cam 26 will not be effective to rotate the lever arm 25 into an upright and locking position because when the bolt 23 is retracted, the arm 25 is not in contact with the cam 26. The arm 25 will not come into contact with the cam 26 until the device 11 is removed from the rack 10. Then the cooperation previously described between the cam 26 and the arm 25 will automatically rotate the bolt 23 into a locking position.

Figure 7:
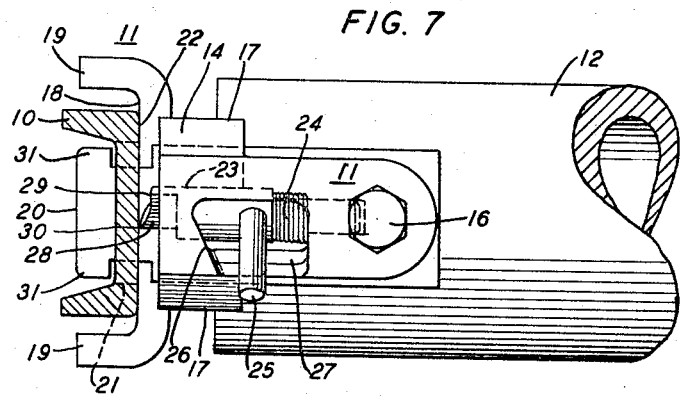
FIG. 7 is a top view of the device and its associated rack, showing the bolt face cam in contact with the face of the rack.
Figure 8:
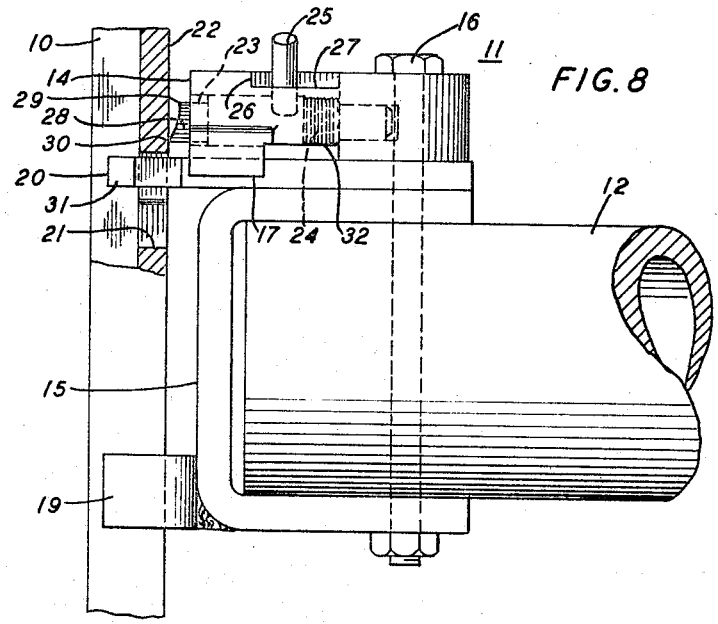
FIGS. 8 and 9 are side views of the device and the rack showing the operation of the bolt face cam.

The second point 30 provides a secondary positioning function. FIGS. 7 and 8 show the device 11 from a top and side view as it is being mounted upon a rack 10. As has previously been stated, the cam 26 positions the bolt 23 in a locking position before the device 11 is mounted upon a rack 10. However, as shown in FIGS. 7 and 8, when the device 11 is mounted upon a rack 10, the bolt 23 must of necessity retract to successfully complete the mounting operation. The cam 26 threefore cannot insure that the bolt 23 will remain in a locking position because it is no longer in contact with the arm 25. If, for example, the bolt 23 is rotated during the mounting process, as shown in FIGS. 7 and 8, it must be re-rotated into an upright or locking position before it will lock. The long point 30 provides this function.

Figure 10:
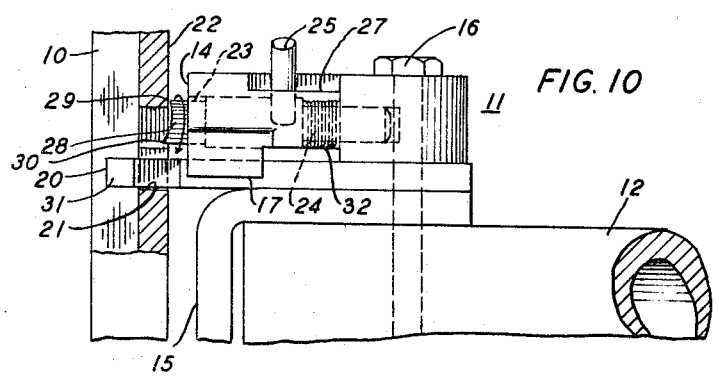
FIG. 10 is a side view of the device and the rack showing the bolt face cam holding the bolt in the unlocked position.

The initial step in mounting the device 11 upon a rack 10 is shown in FIGS. 7 and 8. This step comprises the insertion of the projection 20 into the upper portion of the slot 21. The insertion of the projection 20 into the slot 21 causes the bolt 23 to be forced back into the body member 14 against the spring pressure of the spring 24. The spring 24 in turn urges the long point 30 into contact with the face 22 of the rack 10. The short point 29 will not contact the face 22 of the rack 10 because of its disparity of length with the point 30. FIG. 10 shows the condition under which the point 29 is able to catch the edge of the slot 21 to perform its unlocking operation. The projection 20 must be inserted fully into the slot 21. Thus, the point 30 will extend into the upper portion of the slot 21 and allow the point 29 to contact the edge of the slot 21.

Figure 9:
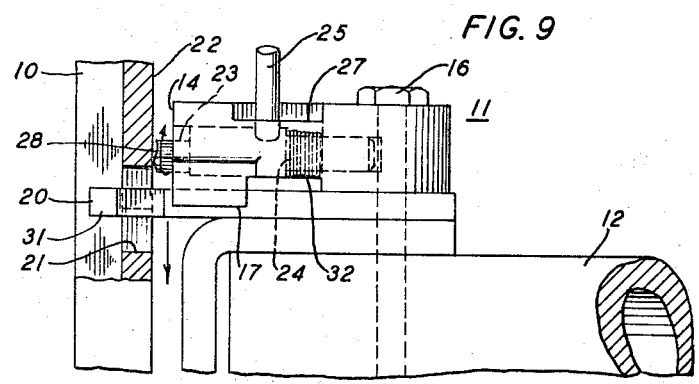

To complete the mounting of the device 11 upon the rack 10, the device 11 is merely pulled down in a vertical direction parallel to the longitudinal axis of the rack 10. If the bolt 23 is accidentally rotated during the initial mounting step, the friction between the point 30 and the face 22 of the rack 10 will cause a torque, as shown in FIG. 9, which will rotate the bolt 23 back into its lock position. The torque is a product of the frictional force and the fact that the second point 30 is located on the circumferential edge of the bolt 23. Thus, unless the arm 25 is forcefully held in a rotated position, the completion of the mounting process, namely the pulling down of the device 11 with respect to the longitudinal axis of the rack 10, creates a torque on the bolt 23 by the frictional reaction between the point 30 and the face 22 of the rack 10 that automatically re-positions or re-rotates the arm 25 into the upright or locking position.

The body member further includes a slotted portion 32. This portion is located between the body member 14 and the support 15 and communicates with the opening in the upper surface of the member 14. If dirt and other debris falls into the opening it may be pushed out through the slot portion 32 in order to clean and keep the device in an operating condition.

It is obvious to those skilled in the art that numerous changes and modifications may be made to the embodiment as it has been disclosed above, without departing from the spirit and scope of the invention.

What is claimed is:

1. In combination: a mounting rack including a series of T-shaped slots, and a latching device comprising a body including a T-shaped head for latching engagement with a respective said slot, a locking bolt with an exposed end comprising a locking seat having an upright position for locking engagement with said slot, means for rotatably and slidably mounting said bolt in said body and for urging same into an extended position, and means responsive to placement of said bolt into said extended position for rotating said locking seat into said upright position.

2. The combination of claim 1 wherein said locking bolt exposed end further comprises a short projection for engagement on the upper edge of said slot in response to rotation and retraction of said bolt, thereby to disengage said locking seat and to hold same in an unlocked position for removal of said device from said rack.

3. The combination of claim 2 wherein said exposed end further comprises a long projection for frictional engagement with said slot upper edge in response to insertion of said T-shaped head into said slot, said bolt thereby being retracted and thereafter said long projection rotating said bolt into said locking seat upright position during the latching engagement of said head with said slot.

References Cited

UNITED STATES PATENTS

| | | | |
|---|---|---|---|
| 1,087,302 | 2/1914 | Kobert | 248—73 |
| 1,706,023 | 3/1929 | Cunningham | 24—223 |
| 1,806,973 | 5/1931 | Kilberg | 292—202 |
| 1,900,328 | 3/1933 | Boggs | 292—242 |
| 1,930,856 | 10/1933 | Mioton | 287—189 |
| 2,422,693 | 6/1947 | McArthur | 287—54 X |
| 2,805,875 | 9/1957 | Modry | 287—20.5 |

REINALDO P. MACHADO, *Primary Examiner.*

HARRISON R. MOSELEY, *Examiner.*

A. I. BREIER, *Assistant Examiner.*